April 7, 1931. G. I. JOHNSON ET AL 1,799,516
VENTILATING WINDOW
Filed Jan. 16, 1928 3 Sheets-Sheet 1

Inventors
G. I. Johnson and
W. L. Morrison
by W. H. Lieber
Attorney

April 7, 1931. G. I. JOHNSON ET AL 1,799,516
VENTILATING WINDOW
Filed Jan. 16, 1928  3 Sheets-Sheet 2

Inventors
G. I. Johnson and
W. L. Morrison
by W. H. Lieber
Attorney

April 7, 1931. G. I. JOHNSON ET AL 1,799,516
VENTILATING WINDOW
Filed Jan. 16, 1928 3 Sheets-Sheet 3
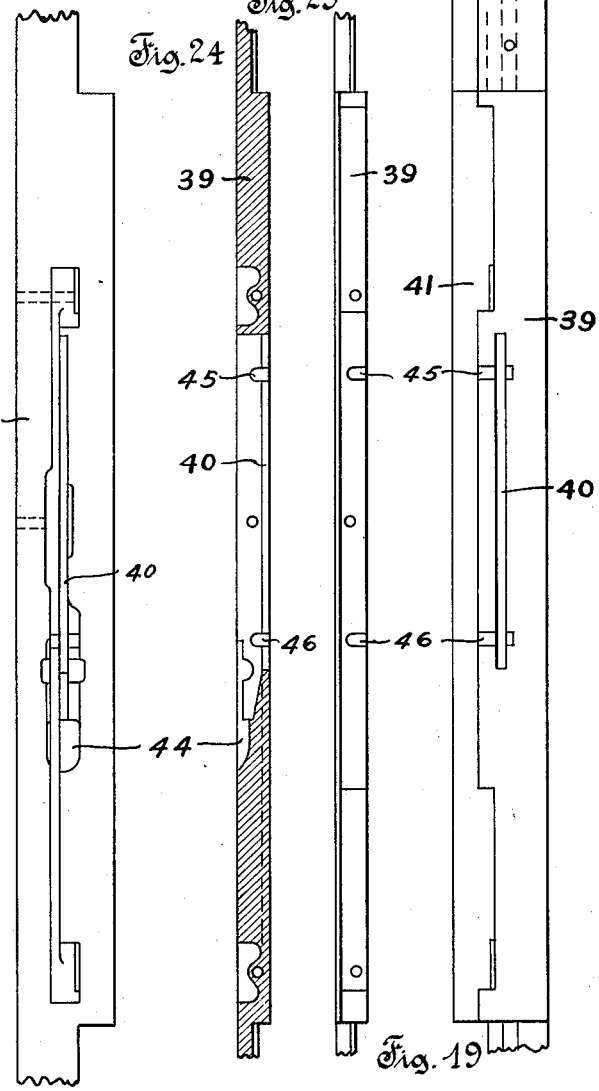

Patented Apr. 7, 1931

1,799,516

UNITED STATES PATENT OFFICE

GUSTAF I. JOHNSON, OF MALDEN, AND WILLARD L. MORRISON, OF MELROSE, MASSACHUSETTS

VENTILATING WINDOW

Application filed January 16, 1928. Serial No. 247,128.

The present invention relates in general to improvements in the art of ventilating vehicles, and relates more specifically to improvements in the construction and operation of ventilating windows or the like, especially applicable to automobiles.

An object of the invention is to provide an improved ventilating device for automobiles or the like, which may be readily manufactured and installed, and which may also be conveniently manipulated. Another object of the invention is to provide improvements in the mode of constructing and of assembling ventilating windows, whereby such structures may be readily fitted or applied to the window openings of any standard closed automobile in order to provide an extremely efficient ventilating system. A further object of the invention is to provide improved manipulating mechanism for ventilators or windows whereby such devices may be conveniently adjusted and effectively locked in open or closed position. Still another object of the invention is to provide improved instrumentalities for supporting a swinging window, and for effecting renewal of the window glass in case the same is broken. Another object of the invention is to provide various improvements in the details of construction and operation of windows of the type forming the subject of a copending application Serial No. 19,217, filed March 30, 1925. An additional object of the invention is to provide various improvements in the details of construction of windows or the like, whereby the cost of manufacture thereof is reduced to a minimum, and the efficiency of operation is enhanced to a maximum. These and other objects and advantages will be apparent from the following description.

Some of the novel features disclosed but not specifically claimed herein form the subject of claims appearing in copending application Serial Number 19,217, filed March 30, 1925.

A clear conception of embodiments of the several novel features of the invention and of the mode of constructing and of manipulating windows built in accordance therewith, may be had by referring to the drawings accompanying and forming a part of this specification in which like reference characters designate the same or similar parts in the various views.

Fig. 18 is an outside view of the hinge section of a sectional window frame, showing the same assembled with corner fittings and with fragments of upper and lower connecting pieces.

Fig. 19 is a fragmentary outside view of the locking section of a sectional window frame, showing the same assembled with an upper corner fitting and with a fragment of an upper connecting piece.

Fig. 20 is a transverse horizontal section through the pivot portion of the hinge section of the frame shown in Fig. 18, the section being taken on the line XX—XX of Fig. 18.

Fig. 21 is a transverse horizontal section through the lug portion of the hinge section of the frame, the section being taken on the line XXI—XXI of Fig. 18.

Fig. 22 is a transverse horizontal section through the upper connecting portion of the hinge section of the frame and the adjoining upper corner fitting, the section being taken along the line XXII—XXII of Fig. 18 looking downwardly.

Fig. 23 is a fragmentary inside view of the locking section of the sectional frame.

Fig. 24 is a fragmentary longitudinal vertical sectional view through the locking section of the sectional frame.

Fig. 25 is a fragmentary view of the locking section of the sectional frame looking toward an edge thereof.

Fig. 26 is a transverse vertical section through the joint between the upper connecting piece and the adjacent upper corner fitting, the section being taken along the line XXVI—XXVI of Fig. 18.

Fig. 27 is a transverse vertical section through the upper connecting piece, the section being taken along the line XXVII—XXVII of Fig. 18.

Fig. 28 is a transverse vertical section through the joint between the lower connecting piece and the adjacent lower corner fitting, the section being taken along the line XXVIII—XXVIII of Fig. 18.

Fig. 29 is a transverse vertical section through the lower connecting piece, the section being taken along the line XXIX—XXIX of Fig. 18.

Figure 1:
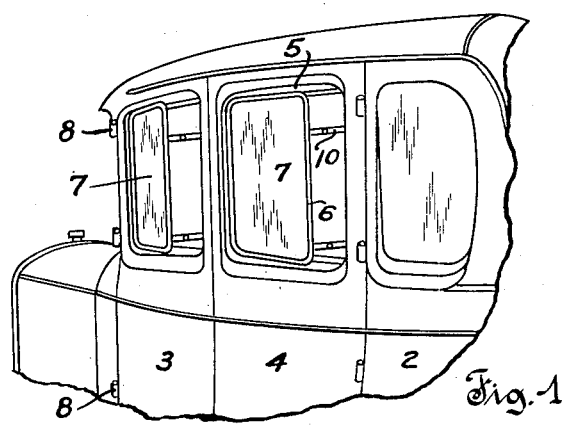
Fig. 1 is a fragmentary perspective view of a totally enclosed type of automobile having a set of the improved ventilating windows applied to the doors thereof.
Figure 3:
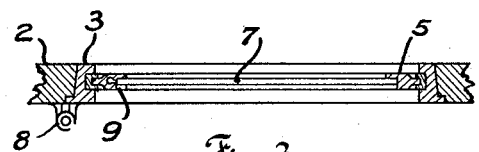
Fig. 3 is a transverse horizontal section through the window portion of the door shown in Fig. 2, the window being illustrated in closed position.
Figure 4:
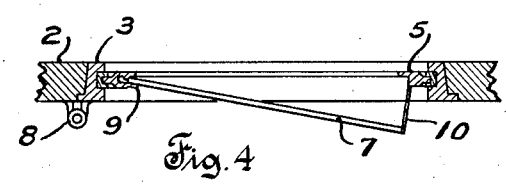
Fig. 4 is a transverse horizontal section through the window portion of the door of Fig. 2, the window being shown in ventilating or open position.
Figure 2:
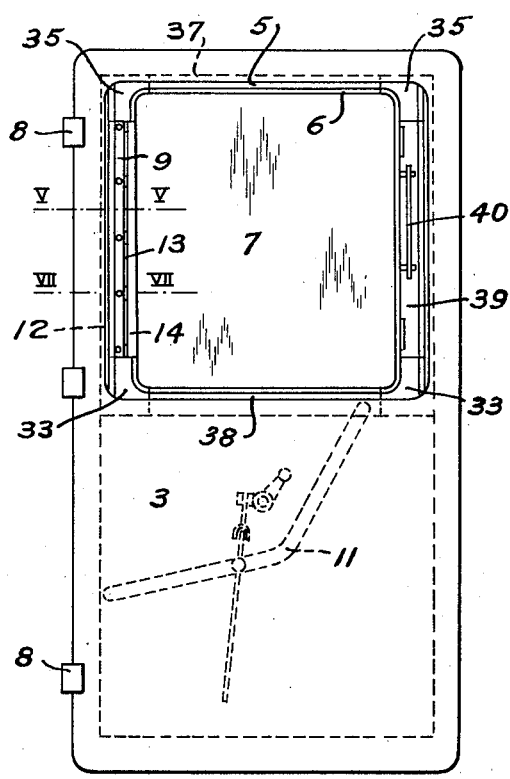
Fig. 2 is an outside view of an automobile door or the like, having one of the improved ventilating windows installed therein.

As specifically illustrated in the drawing, the improved ventilating window comprises in general a main window frame 5 slidably associated with the main frame 3, 4 of a door or the like, an auxiliary glass supporting frame 6 pivotally associated with one side of the slidable frame 5, and locking mechanism associated with the opposite side of the frames 5, 6. As shown, the door frames 3, 4, are swingably supported from the body 2 of the automobile, by means of hinges 8, and each of these door frames is provided with an upper opening and with a pocket below the opening. The window frame 5 coacts with slides formed at the opposite sides of the door frame, and is adapted to be moved upwardly into the door frame opening or downwardly into the pocket, by means of actuating mechanism 11 of well known structure. When the window frame 5 is in uppermost position, both sides and the top and bottom thereof are firmly held against displacement, by the rigid structure of the door frame, and the auxiliary glass supporting frame 6 is free to be swung outwardly through the door frame opening, as shown in Figs. 1, 2, 3 and 4.

Figure 5:
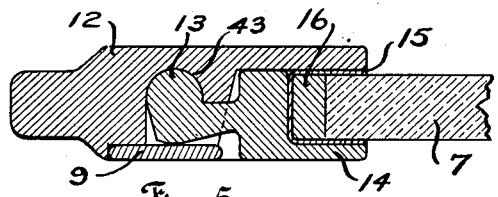
Fig. 5 is an enlarged transverse horizontal sectional view of the hinge portion of the improved window, showing the window in closed position, the section being taken on the line V—V of Fig. 2.
Figure 6:
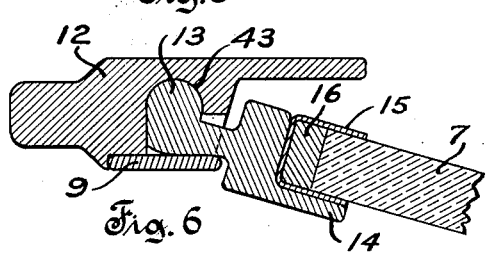
Fig. 6 is an enlarged transverse horizontal sectional view of the hinge portion of the improved window, showing the window in open position.
Figure 7:
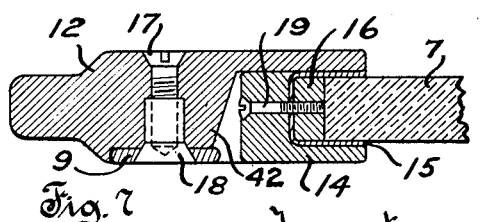
Fig. 7 is an enlarged transverse horizontal sectional view of the lug portion of the hinge section of the improved window, showing the window in closed position, the section being taken on the line VII—VII of Fig. 2.

A window glass 7 is detachably secured within the auxiliary frame 6 by means of a removable end section 15 which is detachably secured to the hinge member 14 by means of screws 19 coacting with the member 14 and with a retaining strip 16 as shown in Fig. 7. The hinge member 14 is provided with integral pivots 13 which snugly fit sockets or recesses 43 formed in the side hinge section 12 of the window frame 5, as illustrated in Figs. 5 and 6, and which are retained within the recesses by means of a detachable hinge plate 9. The plate 9 may be formed of metal or other suitable material, and is attached to the frame section 12 by means of machine screws 17 coacting with retaining sockets 18 located on the inside and outside of the window respectively so that the hinge plate 9 cannot be removed without entering the automobile to which the window has been applied.

Figure 8:
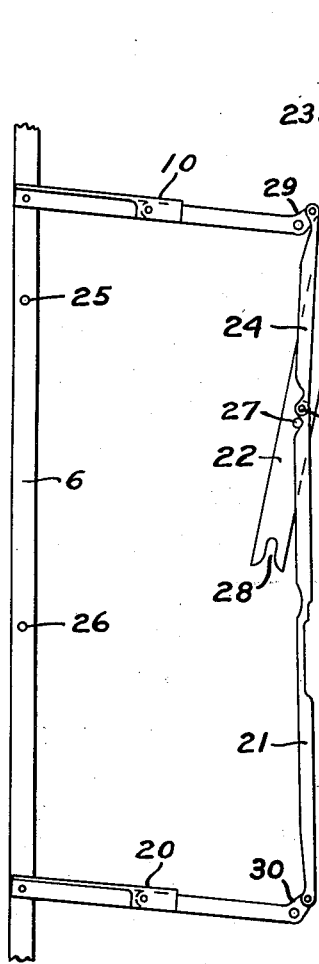
Fig. 8 is an elevation of the window adjusting and locking mechanism, showing the position of the mechanism when the window is in full open position.
Figure 9:
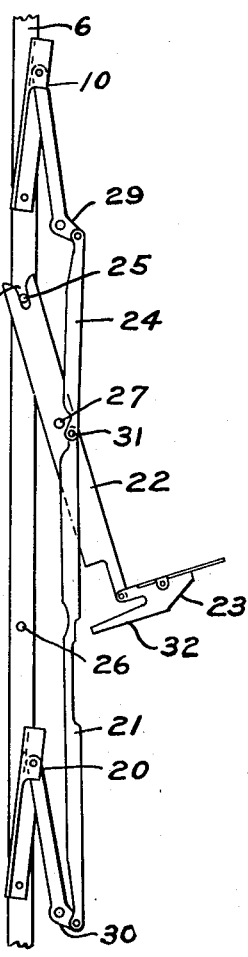
Fig. 9 is an elevation of the window adjusting and locking mechanism, showing the position of this mechanism when the window has been partially closed.
Figure 10:
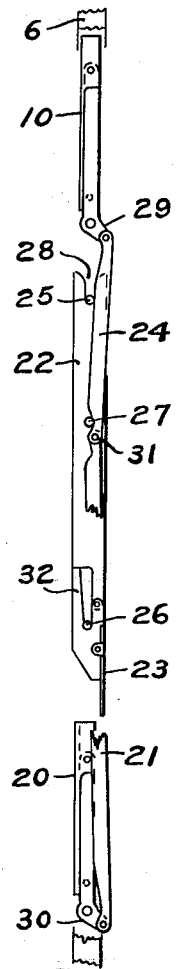
Fig. 10 is an elevation of the window adjusting and locking mechanism, showing the position of this mechanism when the window is locked in closed position.
Figure 11:
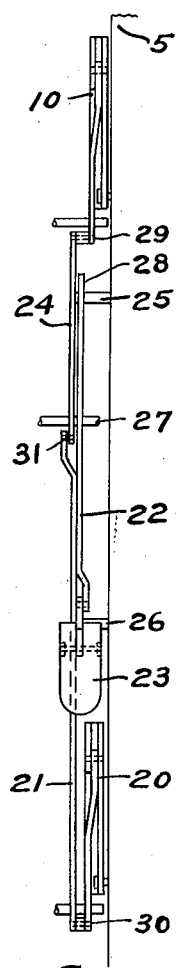
Fig. 11 is a side view of the window adjusting and locking mechanism, showing the position thereof when the window is in closed and locked position.
Figure 12:
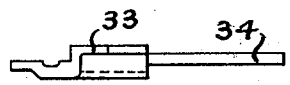
Fig. 12 is an enlarged top view of one of the lower corner fittings of a sectional window frame.
Figure 13:
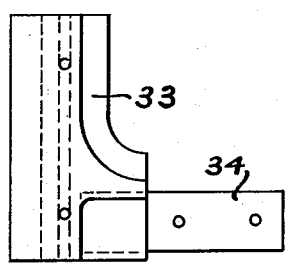
Fig. 13 is an enlarged side view of the lower corner fitting shown in Fig. 12.
Figure 14:
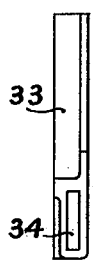
Fig. 14 is an enlarged end view of the lower corner fitting shown in Figs. 12 and 13.
Figure 15:
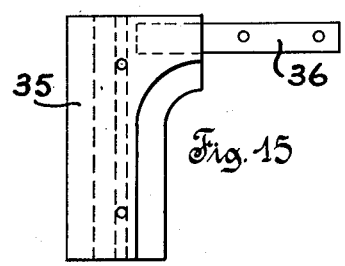
Fig. 15 is an enlarged side view of one of the upper corner fittings of a sectional window frame.
Figure 16:
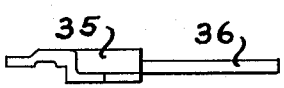
Fig. 16 is an enlarged bottom view of the upper corner fitting shown in Fig. 15.
Figure 17:
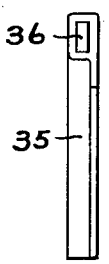
Fig. 17 is an enlarged end view of the upper corner fitting shown in Figs. 15 and 16.

The window locking and adjusting mechanism which is associated with the latch section 39 of the frame 5 at the side thereof opposite from the hinge section 12, is shown in detail in Figs. 8, 9, 10 and 11. This mechanism comprises upper and lower toggles 10, 20 respectively which when straightened as shown in Fig. 8, lock the auxiliary frame 6 in open position, and when flexed as shown in Fig. 10, tightly close the window. The links of the toggles 10, 20, which are pivotally attached to the frame 6, have portions extending beyond the intermediate toggle pivots, these portions being adapted to coact with the other toggle links in order to prevent movement of the toggles beyond straight position. The inner ends of the inner links of the toggles 10, 20 are provided with cranks 29, 30, the upper crank 29 being pivotally attached to the upper end of a connector 24 and the lower crank 30 being likewise pivotally attached to the lower end of a connecting rod 21. The adjoining ends of the connector 24 and of the connecting rod 21 are pivotally attached by means of a common pivot pin 31, to a toggle actuating lever 22 which is pivotally attached to the latch section 39 of the frame 5 by means of a pivot 27 located a slight distance from the pin 31. The outer swinging end of the lever 22 is provided with a recess or notch 28 which is adapted to engage an upper pin 25 secured to the auxiliary frame 6 in order to lock the window in closed position. The inner swinging end of the lever 22 provides a support for a locking latch 23 which is pivotally attached to the lever 22 and which is also provided with a locking hook 32 adapted to engage a lower pin 26 secured to the frame 6 in order to additionally lock the window in closed position. With this arrangement of elements, it will be apparent that a double lock is provided for securing the window in closed position, which lock may be released only from within the automobile.

As specifically illustrated in Figs. 8 to 29 inclusive, the window frame 5 may be formed of sections in order to permit convenient construction thereof, and to facilitate application of the improved design to door structures having openings of various sizes and shapes. The oppositely disposed hinge and latch sections 12, 39 have upper and lower ends of reduced cross-section which are ridged and fitted in the longitudinal recesses of upper and lower corner fittings 35, 33 respectively. These elements may be riveted or otherwise firmly united and the ridged construction makes the unions especially adapted to resist lateral stresses. The upper corner fittings 35 are of right and left construction and are provided with tenons 36 which are snugly fitted within openings in the ends of the upper connector bar 37 and which may be rigidly attached to this bar by riveting or otherwise. The lower corner fittings 33 are likewise of right and left construction and are provided with tenons 34 which are snugly fitted within openings in the ends of the lower connector bar 38 and which may be rigidly attached to this bar by riveting or otherwise. The hinge section 12 besides being provided with the pivot recesses 43, are also provided with intervening pads or lugs 42 for effecting rigid attachment of the hinge plate 9. The latch section 39 is provided with a slot 40 wherein the lever 22 is adapted to swing, and also has notches 45, 46 formed in the outer portion thereof for receiving the pins 25, 26 respectively of the frame 6, when the window is locked in closed position. The latch section 39 is additionally provided with a recess 44 and with other indentations for permitting disposition of the adjusting and locking mechanism so that the elements thereof are substantially flush with the outer and inner surfaces of the section 39 when the window is closed. It will be apparent from the foregoing description, that with the sectional frame construction, the window may be readily fitted to various sized and shaped openings by merely forming the side, top and bottom sections of suitable length.

The improved window may be readily applied for ventilating purposes, to any standard closed type of automobile, but when thus applied, the hinge portions or sections 12 should preferably be disposed at the front of the window. The application of the improved ventilating window is not confined to the door windows of automobiles, but may be extended to other windows thereof as well as to other classes of vehicles and enclosures. With the improved ventilating window properly installed in a vehicle, the glass supporting frame 6 may be swung to open or closed position at will, by manipulation of the lever 22 with the aid of the latch 23. When the lever 22 is swung about its supporting pivot 27, the pivot pin 31 acts as a crank and moves the toggle actuating cranks 29, 30 through the connector 24 and the connecting rod 21, as will be clearly apparent from Figs. 8, 9 and 10. With the window in extreme open position, the various elements are positioned substantially as shown in Fig. 8, whereas closed and locked position of the window has been illustrated in Fig. 10. Fig. 9 discloses the mechanism approaching locking position, and it will be apparent that when locking has been effected, the notch 28 of the lever 22 engages the upper locking pin 25 of the frame 6 and the hook 32 of the latch 23 simultaneously engages the lower locking pin 26. A double lock is thereby assured, and the two toggles 10, 20 insure rigid retention of the window in open position. As the vehicle advances in a forward direction when the ventilating windows are open, the rearwardly directed openings produce a suction which withdraws air from within the car without creating annoying and undesirable drafts therein.

From the foregoing description it will be apparent that the improved ventilating window may be readily manufactured and installed, and conveniently manipulated. The sectional construction permits ready application of the improvement to various standard types of automobiles as well as to other enclosures. The manipulating and locking mechanism besides permitting convenient adjustment also insures effective locking of the window in closed position and provides a flush lock which is hardly visible although readily accessible. The improved hinge structure besides insuring rigidity, enables rapid removal of the glass when broken, and the relatively thin metal frame 6 may be fitted to snugly confine the glass 7 thereby eliminating rattling. The structure furthermore presents an extremely neat and pleasing appearance affording an added attraction to any automobile, and the various elements may be manufactured from suitable materials such as steel and aluminum at relatively low cost.

Actual use of the improved device has proven its effectiveness as a ventilator for closed cars. By virtue of the fact that the device is preferably associated with the side windows and that the front of the vehicle is normally enclosed by the windshield, the sweep of the air past the sides of the car while in motion, creates a vacuum at the rearwardly directed outlets provided by these windows when open thereby sucking the impure air from within the enclosure and allowing fresh air to enter through the heater inlets, cowl or other openings. This suction effect varies as the speed of the car is varied and permits smoking within the vehicle without polluting the atmosphere. The opening afforded by the window also permits convenient signaling and ejection of ashes or the like by occupants of the machine.

It should be understood that it is not desired to limit the invention to the exact details of construction and to the precise mode of operation herein shown and described, for various modifications within the scope of the claims may occur to persons skilled in the art.

It is claimed and desired to secure by Letters Patent:—

1. A ventilating window comprising, a window frame, a window pivotally associated with said frame, a plurality of toggles for moving said window about its pivotal mounting, a movable member directly connecting said toggles, and a single lever for manipulating all of said toggles through said member.

2. A ventilating window comprising, a window frame, a window movably associated with said frame, a plurality of toggles for moving said window, a movable member directly connecting said toggles, and a single lever for flexing and for straightening all of said toggles through said member to move said window.

3. A ventilating window comprising, a window frame, a window pivotally associated with one side of said frame, a plurality of toggle for swinging said window about its pivotal mounting, a movable member directly connecting said toggles, a single lever for flexing and for straightening said toggles through said member, and means for positively locking said lever when said toggles are in flexed condition.

4. A ventilating window comprising, a main frame having an opening, a window frame slidably associated with said main frame at said opening, a window pivotally associated with said window frame, a plurality of toggles for swinging said window about its pivotal mounting, a movable member directly connecting said toggles, and a single lever for manipulating said toggles through said member to effect swinging movement of said window.

5. A ventilating window comprising, a window frame, a window movably supported by one side of said frame, a plurality of toggles associated with the opposite side of said frame for moving said window, a movable member directly connecting said toggles, and a double lock cooperating with said toggles through said movable member to lock said window in closed position.

6. A ventilating window comprising, a window frame, a sectional auxiliary frame supporting a glass, and a hinge pivotally uniting said frames, the glass being freely removable from said auxiliary frame upon separation of the sections thereof when said hinge is disconnected.

7. A ventilating window comprising, a window frame, a window pivotally supported by one side of said frame, upper and lower toggles connecting said frame and said window at the opposite side of said frame, common actuating means coacting directly with said toggles, and a plurality of locks cooperating with said frame and said window and said actuating means at the toggle side of said frame.

8. A ventilating window comprising, a window frame, a window pivotally associated with one side of said frame, upper and lower toggles connecting said frame and said window at the opposite side of said frame, a lever pivoted to said frame adjacent to said toggles, and direct connections between said lever and both of said toggles for actuating the latter.

9. A ventilating window comprising, a window frame, a window pivotally associated with one side of said frame, a pair of toggles connecting said frame and said window at the opposite side of said frame, a lever pivotally associated with said frame at the toggle side thereof, and means carried by said lever and cooperating directly with said toggles and with said window to provide a double lock for said window when closed.

10. A ventilating window comprising, a window frame, a sectional glass supporting frame, and a hinge pivotally uniting said frames, the glass being freely removable from said sectional frame by separation of the sections thereof when said hinge is disconnected.

11. A ventilating window comprising, a window frame having a recess in one side thereof, a sectional glass supporting frame, and a hinge section rigidly attached to said sectional frame and pivotally associated with said recess, the glass being freely removable from said sectional frame when said hinge section is disconnected therefrom.

In testimony whereof, the signatures of the inventors are affixed hereto.

GUSTAF I. JOHNSON.
WILLARD L. MORRISON.